(12) United States Patent
Zhao

(10) Patent No.: US 6,710,880 B1
(45) Date of Patent: Mar. 23, 2004

(54) INTERFEROMETRIC APPARATUS FOR ULTRA-HIGH PRECISION DISPLACEMENT MEASUREMENT

(75) Inventor: Feng Zhao, Arcadia, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1 day.

(21) Appl. No.: 09/950,237

(22) Filed: Sep. 6, 2001

(51) Int. Cl.[7] .................................................. G01B 9/02
(52) U.S. Cl. ........................................................ 356/486
(58) Field of Search .................. 356/482, 485, 356/486, 487, 492, 493, 498

(56) References Cited

U.S. PATENT DOCUMENTS

| | | | | |
|---|---|---|---|---|
| 5,483,374 A | * | 1/1996 | Tanuma ...................... | 359/328 |
| 5,764,362 A | * | 6/1998 | Hill et al. .................... | 356/487 |

OTHER PUBLICATIONS

Halverson et al., "Progress Towards Picometer Accuracy Laser Metrology for the Space Interferometry Mission," 11 pgs., Cal–Tech Jet Propulsion Laboratory, Pasadena, CA, issued Oct. 17, 2000.

Bobroff, Norman, "Recent Advances in Displacement Measuring Interferometry," pp. 907–926, Meas. Sci. Technol., vol. 4 (1993).

* cited by examiner

*Primary Examiner*—Samuel A. Turner
*Assistant Examiner*—Michael A. Lyons
(74) *Attorney, Agent, or Firm*—John H. Kusmiss

(57) ABSTRACT

A high-precision heterodyne interferometer measures relative displacement by creating a thermally-insensitive system generally not subject to polarization leakage. By using first and second light beams separated by a small frequency difference ($\Delta f$), beams of light at the first frequency ($f_o$) are reflected by co-axial mirrors, the first mirror of which has a central aperture through which the light is transmitted to and reflected by the second mirror. Prior to detection, the light beams from the two mirrors are combined with light of the second and slightly different frequency. The combined light beams are separated according to the light from the mirrors. The change in phase ($\Delta \phi$) with respect to the two signals is proportional to the change in distance of Fiducial B by a factor of wavelength ($\lambda$) divided by $4\pi$ ($\Delta L = \lambda \Delta \phi 1/(4\pi)$). In a second embodiment, a polarizing beam splitting system can be used.

20 Claims, 2 Drawing Sheets

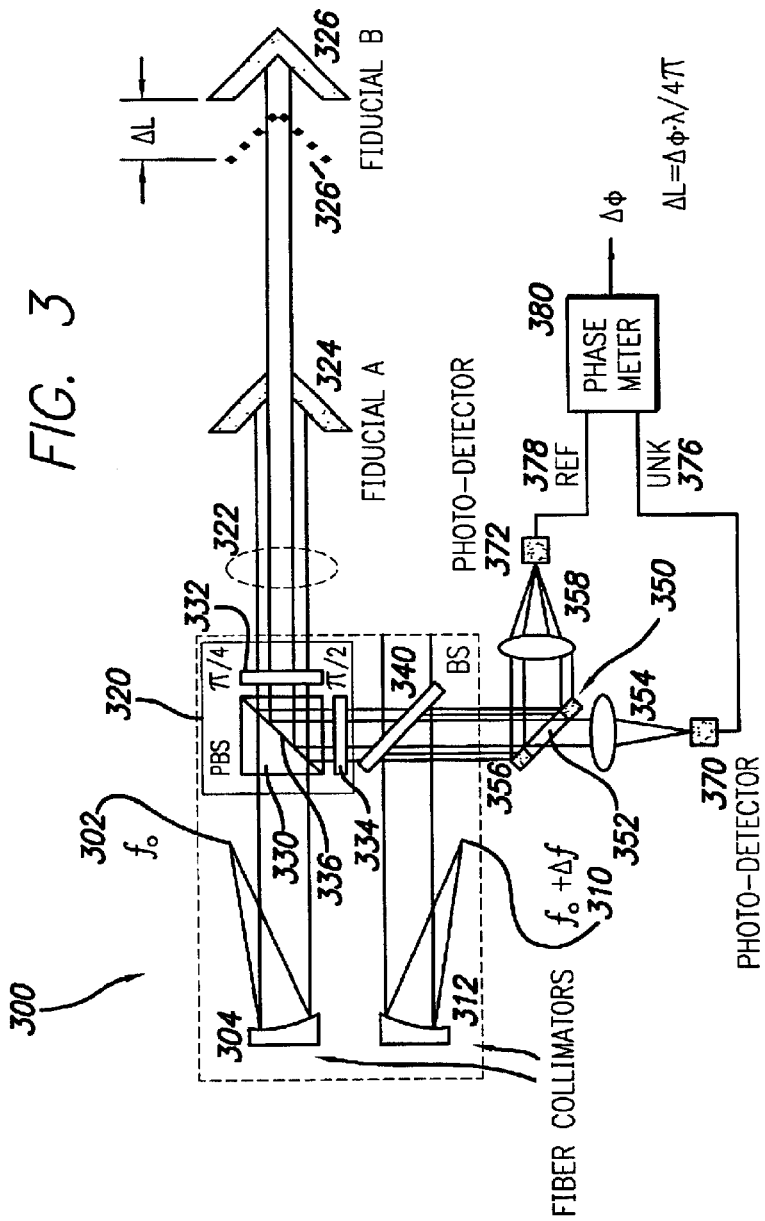
FIG. 3
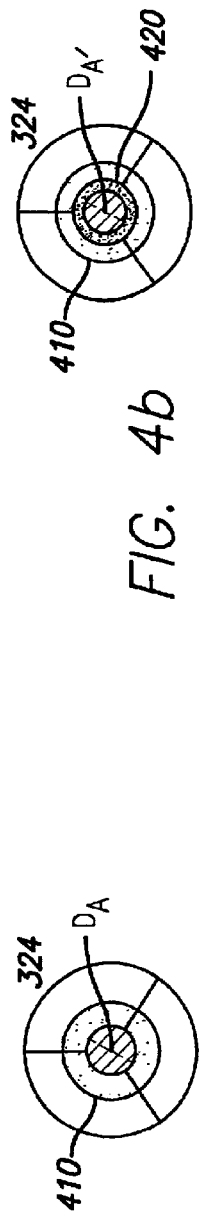
FIG. 4b
FIG. 4a

INTERFEROMETRIC APPARATUS FOR ULTRA-HIGH PRECISION DISPLACEMENT MEASUREMENT

STATEMENT AS TO RIGHTS TO INVENTIONS MADE UNDER FEDERALLY-SPONSORED RESEARCH AND DEVELOPMENT

The invention described herein was made in the performance of work under a NASA contract, and is subject to the provisions of Public Law 96-517 (35 U.S.C. 202) in which the contractor has elected not to retain title.

BACKGROUND OF THE INVENTION

1. Field of the Invention

This invention relates to interferometry and more particularly to interferometric devices used for measuring relative distances between two objects.

2. Description of the Related Art

Interferometry is the area of science that uses interference patterns to evaluate data such as the distance between two objects. In radio astronomy, interference patterns are generated by adding signals radiated from a star or the like. A phase difference is generated by providing the two signals from spatially-separated antennas. The longer the base line, the higher the resolving power of the radio antenna.

Interferometry is used to measure short distances using laser light that is reflected and refracted in certain predictable ways. The famous Michaelson-Morley experiment is one example of this, and such devices are used in a similar fashion today. In a Michaelson interferometer, when the displacement mirror is moved, the interference pattern cyclically changes, showing the alternating constructive and destructive interference between the two light wave fronts. The cyclic nature of the interference pattern indicates the relative phase difference between the two light wave fronts. This is dependent upon the wavelength of light with smaller wavelengths of light providing more accurate measurements.

Present-day displacement-measuring interferometers generally use two orthogonal polarizations corresponding to two interfering light beams. Leakage occurs across the two otherwise independent light beams, resulting in a phenomena called polarization leakage. When the polarization leaks from one light beam to another, the phase differences between the two are changed and the phase measurement is contaminated. The errors arising in the phase measurement are periodic and non-linear errors. From most commercial interferometers, this non-linear error is approximately 1–10 nm ($10^{-9}$ m). Additionally, such interferometers are subject to thermal errors arising from temperature changes occurring in the apparatus. The thermal sensitivity of such present-day devices gives rise to errors of approximately 100 nm per degree Kelvin (° K.). These thermal errors arise from non-compensated paths that the light beams take through the optics of the devices.

As present-day interferometers suffer from certain flaws and errors in measurement arising from the construction of such interferometers, it would be an advance in the art to provide an interferometer that does not generate polarization leakage and that also avoids errors arising from thermal sensitivity.

SUMMARY OF THE INVENTION

The interferometer of the present invention uses two stable collimated laser beams that are slightly different in frequency, i.e., $f_0$ for one beam and $f_0+\Delta f$ for the other beam. The $f_0$ wavefront is split into two or more symmetric sections with a reference device such as a truncated corner cube or a retro-mirror with holes. The wavefront portions that are reflected from the reference device then serve as reference signals. The remaining wavefront portions are directed to the measurement target(s) which retro-reflect the measurement beams back to the interferometer. All these portions will then be mixed (interfered) with the $f_0+\Delta f$ beam which serves as a local oscillator. These heterodyne fringes are then separated with truncated mirrors and focused into photo-detectors.

The phase difference ($\Delta\phi$) between the measurement signals and reference signals is measured with phase meters. The displacement ($\Delta L$) between the target(s) and the reference device is related to the phase difference: $\Delta L = \lambda\Delta\phi 1/(4\pi)$.

Because the reference signals are derived from the same wavefront as the measurement signals, the optical path length change in the optical elements consisting of the interferometer is common-mode. Thus the interferometer is insensitive to soak temperature changes.

There is no polarization leakage in this interferometer. In addition, angle-polished fibers are used in the construction of the collimators to minimize the back-reflection from the fiber tip. The beam splitters have a small wedge so that the ghost reflection from the back surface will not contaminate the heterodyne signals. These measures greatly reduce the periodic nonlinear error of the interferometer.

The present invention provides measurements within accuracy of approximately 20 picometers ($10^{-12}$ m). Additionally, the present invention provides an a thermalized structure to provide a device that is orders of magnitude less sensitive to thermal shifts than prior interferometers. The present invention also provides greater accuracy. A wavefront split of a heterodyne light signal is used as the means by which displacement measurements are made. This is in contrast to existing devices that use an amplitude split rather than a wavefront split in order to make such displacement measurements. By using a wavefront split, the present invention exhibits extremely low self-interference and avoids the problems of polarization leakage leading to the higher accuracy in measurements. Additionally, each light path is generally the same, which allows errors from thermal sensitivity to cancel out or be significantly diminished.

When the second optical target, which is the one subject to relative displacement, is moved with respect to the first target, the change in distance ($\Delta L$) is equal to the change in the phase ($\Delta\phi$) times the wavelength of the light ($\lambda$) divided by four pi ($4\pi$) ($\Delta L = \Delta\phi(\lambda/4\pi)$). Two embodiments are currently known, however other embodiments may be developed in the future.

OBJECTS OF THE INVENTION

It is an object of the present invention to provide more accurate measurements for relative displacement.

It is yet another object of the present invention to provide better measurements of relative displacement by using interferometry.

It is yet another object of the present invention to provide a better relative-displacement interferometer that is generally athermalized and not as subject to changes in thermal conditions.

It is yet another object of the present invention to provide an interferometer that is less subject to polarization leakage in order to provide better phase difference measurements.

These and other objects and advantages of the present invention will be apparent from a review of the following specification and accompanying drawings.

BRIEF DESCRIPTION OF THE DRAWINGS

FIG. 3 is a schematic of a second embodiment of the present invention.

FIG. 4a is a schematic view of a mirror used at Fiducial A as shown in FIG. 3, with the mirror of FIG. 4a having a hole in the center and being generally identical to the mirror shown in FIG. 2a.

FIG. 4b is a schematic view of an alternative mirror used at Fiducial A as shown in FIG. 3, with the mirror of FIG. 4b having a hole in the center and being generally identical to the mirror shown in FIG. 2b including a guard band that ensures separation of Fiducial B light from Fiducial A light.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention provides means by which more accurate measurements can be provided from an interferometric apparatus. The interferometric apparatus for high precision displacement measurement of the present invention is less subject to thermal instability as well as diminishing any or all polarization leakage present between the two light beams used to determine the relative measurement.

Figure 1:
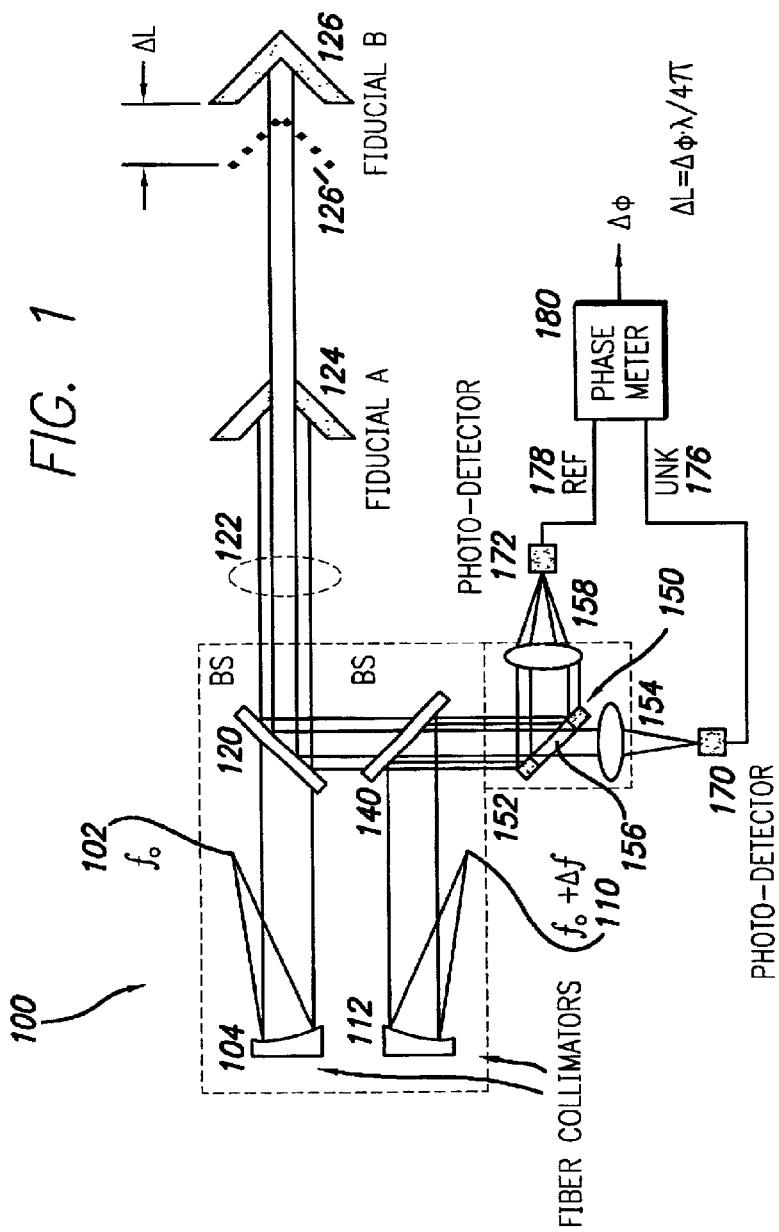
FIG. 1 is a schematic view of a first embodiment of the present invention.

FIG. 1 shows a first embodiment of the high precision interferometer 100 of the present invention. Light of the first wavelength $f_0$ 102 illuminates a first fiber collimator 104. Light of a second frequency, $f_0+\Delta f$, 110 illuminates a second fiber collimator 112. The light from the second source 110 at a frequency of $f_0+\Delta f$ is transmitted to both photodetectors as described in more detail below. In this way, a known frequency of light is shared and is a part of both the reference signal and the reference (REF) and displacement/unknown (UNK) signals.

Light from the first light source $f_0$ 102 illuminates the first fiber collimator 104 and is transmitted to a first, or displacement, beam splitter 120. Some of this light is reflected towards the upper portion of the page showing FIG. 1 and exits out of consideration (or is discarded) for present purposes. Another portion of the light 122 is transmitted to Fiducial A 124 and Fiducial B 126. Note should be taken that reference 122 refers to both the outgoing and incoming light transmitted to and from Fiducials A and B.

Both Fiducial A 124 and Fiducial B 126 reflect the light transmitted to it back along the path from which it came. Fiducial A 124 is shown in vertical face plan view in FIGS. 2a and 2b. Fiducial A has a central hole or aperture 210 through which the light passes and is transmitted on to Fiducial B 126 and back to the first beam splitter 120. The diameter of the aperture 210 is indicated as $D_A$ in FIG. 2a and as $D_{A'}$ in FIG. 2b.

Figure 2B:
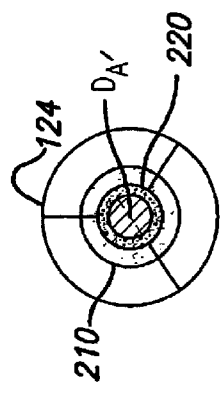
FIG. 2b is a schematic view of an alternative mirror used at Fiducial A in the present invention with a central hole through which light may pass including a guard band that ensures separation of Fiducial B light from Fiducial A light.
Figure 2A:
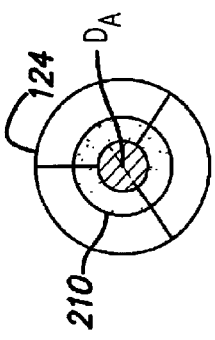
FIG. 2a is a schematic view of a mirror used at Fiducial A in the present invention with a central hole through which light may pass.

FIG. 2b includes a guard band 220 which absorbs light. Preferably, the guard band 220 absorbs 100% of the light that shines upon it. The guard band 220 provides spatial separation for the light transmitted to and from Fiducial B 126 from the light transmitted to and from Fiducial A 124. When spatially separated, the light from Fiducial A and Fiducial B are much less likely to interfere and/or interact with one another. This promotes integrity in the light beams and provides greater confidence and precision in the measurements relying on the light from Fiducial A and Fiducial B. It also creates a band of darkness, or an absence of light, between the light from Fiducial A and Fiducial B.

The first fiber collimator 104, the first beam splitter 120, and Fiducials A and B 124, 126 are aligned with one another for the proper transmission and reflection of the $f_0$ light 102. A second, or reference, beam splitter 140 performs as a lightcombining system and is located adjacent to and in alignment with the first beam splitter 120 in order to receive light reflected by it from Fiducials A and B 124, 126. The second beam splitter 140 also receives light from the second light source 110, with its light of frequency $f_0+\Delta f$. The light from the second light source 110 is transmitted to the second fiber collimator 112 and on to the second beam splitter 140. Consequently, the two fiber collimators 104, 112 may be located adjacent to one another and transmit their light in parallel to the first and second beam splitters 120, 140.

Part of the light transmitted by the second fiber collimator 112 is reflected beam splitter 140 and transmitted on to a centrally apertured mirror 150. Light hitting the centrally-apertured mirror is either transmitted through the central aperture 152 and on to the Fiducial B/displacement reference signal lens 154 or is reflected by the annular mirror 156 on to the Fiducial A/reference signal lens 158.

The light transmitted by the Fiducial B/displacement signal lens 154 is transmitted on to the displacement signal photodetector 170. The light transmitted by the Fiducial A/reference lens 158 is transmitted on to the reference signal photodetector 172. The displacement signal photodetector 170, 172 transmits a signal 176 representing the reflected light from Fiducial B 126, as well as the second light source 110. The Fiducial A/reference signal photodetector 172 also transmits a signal 178 representing the reflected light transmitted from Fiducial A 124 and the second light source 110. Both of the photodetector signals 176, 178 are transmitted to the phase meter 180 from which the relative phase between the two signals can be detected. This results in a number indicating the change in the phase of the light represented by $\Delta\phi$. In order to calculate the change in Fiducial B, represented by $\Delta L$ and shown as the change in Fiducial B from 126' to 126, the change in the phase angle $\Delta\phi$ is multiplied by the wavelength $\lambda$ and divided by $4\pi$ ($\Delta L=\Delta\phi(\lambda/4\pi)$).

As can be seen by inspection of the drawings, the effective cross-section of the central aperture 152 of the annular mirror 150 is the same as the diameter $D_A$ or $D_{A'}$ of the aperture 210 present in Fiducial A 124. The aperture 210 of Fiducial A 124 allows the light transmitted to and transmitted by Fiducial B to pass through Fiducial A. Similarly, the light transmitted to the Fiducial B/displacement signal lens 154 is that light which passes through the central aperture 152 of the annular mirror 150. This central aperture light 152 should contain only Fiducial B light and light from the second light source 110. The light transmitted to the Fiducial A/reference signal lens 158 should only be light transmitted by Fiducial A 124 (at frequency $f_0$) and the light from the second light source 110 (at frequency $f_0+\Delta f$).

The Fiducial A/reference signal photodetector 172 sees only Fiducial A light and the Fiducial B/displacement signal photodetector 170 sees only Fiducial B light with both photodetectors 170, 172 also seeing light from the second light source at a frequency $f_0+\Delta f$. As both photodetectors 170, 172 have light at a common frequency ($f_0+\Delta f$) in phase, and as the photodetectors 170, 172 have separately phased light (Fiducial A light versus Fiducial B light) at the same frequency ($f_0$) but with different phases (due to the movement of Fiducial B 126), the differences between the resulting signals can be transmitted to the phase meter in order to calculate the relative motion of Fiducial B 126 with respect to Fiducial A 124.

When light hits Fiducial B, it is reflected back to the first beam splitter 120 and on to the Fiducial B/displacement signal photodetector 170. As Fiducial B 126 moves, the phase of the light transmitted to the Fiducial B photodetector 170 shifts as the light has a longer distance to travel. The light reflected from Fiducial B is reflected in a manner that preserves the frequency of the light but shifts the phase. The light is generally reflected in the same manner by both Fiducials A and B 124, 126. However, as Fiducial A is a stationary reference, there is generally no phase shifting in the light transmitted by it and on to the Fiducial A/reference signal photodetector 172.

Note should be taken that the path taken by the light from the first light source 102 is generally the same, whether it is reflected by Fiducial A 124 or Fiducial B 126. The $f_0$ light 102 is refracted by the first beam splitter 120, reflected by the mirrors of Fiducials A and B 124, 126, reflected by the first beam splitter 120, refracted by the second beam splitter 140 and transmitted on to the annular mirror 150. At that point, the annular mirror 150 then separates the light from Fiducial A 124 from the light from Fiducial B 126. Both types of light are then transmitted to similar, if not identical, lenses 154, 158 and on to photodetectors 170, 172. While the light from Fiducial A 124 is subject to total reflection by the annular mirror portion 156 of the annular mirror 150, the paths taken by the light are generally the same.

No reliance upon polarization is present in the interferometer shown in FIG. 1. Additionally, as the light from both Fiducial A 124 and Fiducial B 126 is generally the same, any errors arising from thermal sensitivity in the interferometer 100 that would cause the phase to shift between the two beams causes both beams to shift in the same way. Consequently, relative phase shifting between Fiducial A light and Fiducial B light is maintained. As the measurement of relative displacement of Fiducial B is determined by measuring the change in the phase ($\Delta\phi$) between Fiducial A light and Fiducial B light, errors arising from thermal sensitivity are greatly diminished as they cancel out. For example, if thermal sensitivity added 100 nm of phase shift to each beam, the relative phase shift between the two beams remains the same. 100 nm of phase shift has been added to both light beams and the relative phase shift between the two beams would remain for example, 3 nm.

The elements set forth in the interferometer 100 of FIG. 1 are generally known in the art and readily available. For example, Fiducials A and B may be corner cubes or other reflective apparatus. However, the geometry, construction, and operation of the interferometer 100 of FIG. 1 has not previously been seen in the art.

FIG. 3 shows a second embodiment of the high-precision interferometer 300 of the present invention. FIG. 3 shows an interferometer 300 that is identical to the interferometer 100 shown in FIG. 1, except that the beam splitter 120 in FIG. 1 has been replaced by a beam splitting and polarizing system apparatus 320, having a polarizing beam splitter 330, a quarter-wave plate 332 and a half-wave plate 334. The quarter-wave plate 332 is placed between the polarizing beam splitter 330 and Fiducials A and B 324, 326. The half-wave plate 334 is placed between the polarizing beam splitter 330 and the second beam splitter 340.

Generally, the operation of the high-precision interferometer 300 of FIG. 3 is the same as that for the interferometer 100 of FIG. 1, save for the operation of the polarizing beam splitting system 320 indicated by the corresponding dotted line box.

In operation, the $f_0$ light of the first light source 302 is transmitted to the first fiber collimator 304. The fiber collimator reflects the light and transmits it on to the polarizing beam splitting system 320, where the light initially encounters the polarizing beam splitter 330. The light transmitted to the polarizing beam splitter 330 is preferably polarized in a P direction that is parallel to the plane defined by the incident light ray and the surface normal of the beam-splitting face 336 (in this case, a horizontal plane in the same plane as the page showing FIG. 3 as opposed to a vertical plane perpendicular to the page). The parallel beam splitter 330 is oriented such that the P-polarized light is transmitted on to the quarter-wave plate 332 while the S-polarized light that is normal to the plane of incidence is transmitted in a direction towards the top of FIG. 3 and exits from further interaction with the interferometer 300.

The P-polarized light is then transmitted to the quarter-wave plate 332. The incident P-polarized light is transformed into circularly polarized light by the quarter-wave plate 332 and transmitted on to Fiducials A and B 324, 326. The circularly-polarized light is reflected by the Fiducials 324, 326 and transmitted back to the quarter-wave plate 332. A circularly-polarized light is then transformed by the quarter-wave plate 332 into S-polarized light. The S-polarized light is then transmitted from the quarter-wave plate 332 on to the polarized beam splitter 330.

The beam splitting phase 336 of the polarizing beam splitter 330 then reflects the S-polarized light from the quarter-wave plate 332 on to the half-wave plate 334. P-polarized light may be transmitted by the beam splitting face 336 back to the fiber collimator 304 and discarded. The transformation by the quarter-wave plate 332 of the P-polarized light to S-polarized light enables the S-polarized light to be reflected by the beam splitting face 336 and on to the half-wave plate 334.

The half-wave plate 334 rotates the polarization of incident light by one-half. This transforms the incident S-polarized light to P-polarized light in a single step, whereas the transformation took two steps for the quarter-wave plate 332. In undergoing the polarization transformations from the fiber collimator 304 to the second beam splitter 340, the light transmitted to and reflected by both Fiducials 324, 326 undergo the exact same transformations. Consequently, and in a manner indicated above, any errors introduced into the relative phase shift between the light beams from Fiducial A 324 and Fiducial B 326 cancel out.

Upon leaving the half-wave plate 334 and the polarizing beam splitting system 320, the light from Fiducials A and B 324, 326 undergoes the same operations as set forth above with respect to the first embodiment interferometer 100 of FIG. 1. The relative phases between the resulting light beams as combined with the light from the second light source 310 is then determined, and the relative distance $\Delta L$ experienced by Fiducial B is then determined by multiplying the change in the phase angle ($\Delta\phi$) times the wavelength of light ($\lambda$) divided by $4\pi$ ($\Delta L=\Delta\phi(\lambda/4\pi)$).

Laser light that may be used in the present invention includes such laser light as that generated by a Zeeman laser or laser light that has been split from a single beam and modulated to provide two near-frequency laser beams. Such modulation may include acousto-optically modulated light.

While the present invention has been described with regards to particular embodiments, it is recognized that additional variations of the present invention may be devised without departing from the inventive concept. For example, Fiducial A may also be moveable relative to Fiducial B, and the relative measurement between the two established. Additionally, Fiducial B may be a target such as that used or semi-conductor manufacture or computer-component operation or manufacture (such as hard disk drives). If the path traveled by the Fiducial B light is very protectable, Fiducial B 326 may be a long distance from Fiducial A. Under such circumstances, if Fiducial B is held stationary, any changes in the phase with respect to Fiducial A and Fiducial B indicate a phenomena, such as a gravitational wave, that has occurred between Fiducials A and B 324, 326.

What is claimed is:

1. A displacement-measuring device for determining relative motion of an object, comprising:
    a first light source emitting light at a first frequency ($f_0$) and a first wavelength ($\lambda$);
    a second light source emitting light at a second frequency ($f_0+\Delta f$) slightly offset from said first frequency;
    a displacement fiducial reflecting said first frequency light to provide displacement fiducial light;
    a reference fiducial reflecting said first frequency light to provide reference fiducial light, said reference fiducial defining an aperture through which said displacement fiducial light may pass;
    a light-combining system combining said reference fiducial light with said second frequency light to provide reference light and combining said displacement fiducial light with said second frequency light to provide displacement light, said light-combining system keeping said reference light separable from said displacement light; and
    a phase meter coupled to said reference light and said displacement light, said phase meter determining a change in phase ($\Delta\phi$) between said reference light and said displacement light; whereby
    relative displacement ($\Delta L$) of said displacement fiducial with respect to said reference fiducial is determined by multiplying said phase change ($\Delta\phi$) by a factor.

2. A displacement-measuring device for determining relative motion of an object as set forth in claim 1, further comprising:
    said first and second light source including laser light selected from the group consisting of:
    laser light from a Zeeman laser; and
    first and second modulated laser beams derived from a single split laser beam, including acousto-optically modulated laser beams.

3. A displacement-measuring device for determining relative motion of an object as set forth in claim 1, wherein said reference fiducial further comprises:

a guard band, said guard band circumscribing said aperture, said guard band absorbing light and said guard band separating light traveling through said aperture from light reflected by said reference fiducial.

4. A displacement-measuring device for determining relative motion of an object as set forth in claim 1, further comprising:
    said displacement fiducial aligned with said reference fiducial.

5. A displacement-measuring device for determining relative motion of an object as set forth in claim 1, further comprising:
    said light-combining system including a reference beam splitter, said reference beam splitter refracting said reference fiducial light and said displacement fiducial light, said reference beam splitter reflecting said second frequency light.

6. A displacement-measuring device for determining relative motion of an object as set forth in claim 1, further comprising:
    a reference photodetector receiving said reference light and coupled to said phase meter; and
    a displacement photodetector receiving said displacement light and coupled to said phase meter.

7. A displacement-measuring device for determining relative motion of an object as set forth in claim 1, further comprising:
    a displacement beam splitter refracting said first frequency light to said reference and moving fiducials; said displacement beam splitter reflecting said reference fiducial light and said displacement fiducial light to said light-combining system.

8. A displacement-measuring device for determining relative motion of an object as set forth in claim 1, further comprising:
    a polarizing beam system including a polarizing beam splitter, a quarter-wave plate, and a half-wave plate;
    said polarizing beam splitter receiving said first frequency light and transmitting resulting P-polarized light to said quarter-wave plate and transmitting resulting S-polarized light away from said light-combining system;
    said quarter-wave plate receiving said P-polarized light from said polarizing beam splitter and transmitting circularly polarized light to said reference and displacement fiducials;
    said quarter-wave plate receiving said reference fiducial light and said displacement fiducial light, said reference fiducial and displacement fiducial light being circularly polarized, said quarter-wave plate transmitting S-polarized light to said polarizing beam splitter;
    said polarizing beam splitter receiving said quarter-wave plate S-polarized light and reflecting said quarter-wave plate S-polarized light to said half-wave plate; and
    said half-wave plate receiving said reflected S-polarized light from said polarizing beam splitter and transmitting P-polarized light to said light-combining system; whereby
    circularly polarized light of said first frequency ($f_0$) is reflected by said reference fiducial and said displacement fiducial and P-polarized light of said first frequency ($f_0$) is transmitted to said light-combing system.

9. A displacement-measuring device for determining relative motion of an object as set forth in claim 1, further comprising:

an annular mirror, said annular mirror separating said reference light from said displacement light.

10. A displacement-measuring device for determining relative motion of an object as set forth in claim 1, further comprising:
said factor multiplied by said phase change (Δˆ) being by said first wavelength (S) divided by four pi (4π) (ΔL= Δˆ(S/4π)).

11. A displacement-measuring device for determining relative motion of an object, comprising:
a first light source emitting light at a first frequency ($f_0$) and a first wavelength (λ);
a second light source emitting light at a second frequency ($f_0+\Delta f$) slightly offset from said first frequency;
a reference fiducial reflecting said first frequency light to provide reference fiducial light, said reference fiducial defining a reference aperture through which light may pass;
a displacement fiducial aligned with said reference fiducial and reflecting said first frequency light to provide displacement fiducial light, said displacement light reflected through said reference aperture;
a displacement beam splitter refracting said first frequency light to said reference and moving fiducials, said displacement beam splitter reflecting said reference fiducial light and said displacement fiducial light;
a reference beam splitter, said reference beam splitter refracting said reference fiducial light and said displacement fiducial light reflected by said displacement beam splitter, said reference beam splitter reflecting said second frequency light, said reference beam splitter combining said reference fiducial light with said second frequency light to provide reference light and combining said displacement fiducial light with said second frequency light to provide displacement light, said reference beam splitter keeping said reference light spatially separable from said displacement light;
an annular mirror, said annular mirror defining a separating aperture and separating said reference light from said displacement light by reflecting said reference light, said displacement light passing through said separating aperture;
a reference photodetector receiving said reference light and transmitting a reference signal in response thereto;
a displacement photodetector receiving said displacement light and transmitting a displacement signal in response thereto
a phase meter coupled to said reference photodetector and said displacement photodetector and receiving said reference and displacement signals, said phase meter determining a change in phase (Δϕ) between said reference light and said displacement light according to said reference and displacement signals; whereby
relative displacement of said displacement fiducial with respect to said reference fiducial is determined by multiplying said phase change (Δϕ) by said first wavelength (λ) divided by four pi (4π) (ΔL=Δϕ(λ/4π)).

12. A displacement-measuring device for determining relative motion of an object as set forth in claim 11, further comprising:
said first and second light source including laser light selected from the group consisting of:
laser light from a Zeeman laser; and
first and second modulated laser beams derived from a single split laser beam, including acousto-optically modulated laser beams.

13. A displacement-measuring device for determining relative motion of an object as set forth in claim 11, wherein said reference fiducial further comprises:
a guard band, said guard band circumscribing said reference aperture, said guard band absorbing light and said guard band separating light traveling through said reference aperture from light reflected by said reference fiducial.

14. A displacement-measuring device for determining relative motion of an object, comprising:
a first light source emitting light at a first frequency ($f_0$) and a first wavelength (λ);
a second light source emitting light at a second frequency ($f_0+\Delta f$) slightly offset from said first frequency;
a reference fiducial reflecting said first frequency light to provide reference fiducial light, said reference fiducial defining a reference aperture through which light may pass;
a displacement fiducial aligned with said reference fiducial and reflecting said first frequency light to provide displacement fiducial light, said displacement light reflected through said reference aperture;
a polarizing beam system including a polarizing beam splitter, a quarter-wave plate, and a half-wave plate;
said polarizing beam splitter receiving said first frequency light and transmitting resulting P-polarized light to said quarter-wave plate and discarding resulting S-polarized light;
said quarter-wave plate receiving said P-polarized light from said polarizing beam splitter and transmitting circularly polarized light to said reference and displacement fiducials;
said quarter-wave plate receiving said reference fiducial light and said displacement fiducial light, said reference fiducial and displacement fiducial light being circularly polarized, said quarter-wave plate transmitting S-polarized light to said polarizing beam splitter;
said polarizing beam splitter receiving said quarter-wave plate S-polarized light and reflecting said quarter-wave plate S-polarized light to said half-wave plate; and
said half-wave plate receiving said reflected S-polarized light from said polarizing beam splitter and transmitting P-polarized light so that circularly polarized light of said first frequency ($f_0$) is reflected by said reference fiducial and said displacement fiducial and P-polarized light of said first frequency ($f_0$) is transmitted by said half-wave plate;
a reference beam splitter, said reference beam splitter receiving said P-polarized light from said half-wave plate and refracting said reference fiducial light and said displacement fiducial light reflected by said polarizing beam system, said reference beam splitter reflecting said second frequency light, said reference beam splitter combining said reference fiducial light with said second frequency light to provide reference light and combining said displacement fiducial light with said second frequency light to provide displacement light, said reference beam splitter keeping said reference light spatially separable from said displacement light;
an annular mirror, said annular mirror defining a separating aperture and separating said reference light from said displacement light by reflecting said reference light, said displacement light passing through said separating aperture;
a reference photodetector receiving said reference light and transmitting a reference signal in response thereto;

a displacement photodetector receiving said displacement light and transmitting a displacement signal in response thereto a phase meter coupled to said reference photodetector and said displacement photodetector and receiving said reference and displacement signals, said phase meter determining a change in phase ($\Delta\phi$) between said reference light and said displacement light according to said reference and displacement signals; whereby relative displacement of said displacement fiducial with respect to said reference fiducial is determined by multiplying said phase change ($\Delta\phi$)) by said first wavelength ($\lambda$) divided by four pi ($4\pi$) ($\Delta L=\Delta\phi(\lambda/4\pi)$).

15. A displacement-measuring device for determining relative motion of an object as set forth in claim 14, further comprising:

said first and second light source including laser light selected from the group consisting of:
laser light from a Zeeman laser; and
first and second modulated laser beams derived from a single split laser beam, including acousto-optically modulated laser beams.

16. A displacement-measuring device for determining relative motion of an object as set forth in claim 14, wherein said reference fiducial further comprises:

a guard band, said guard band circumscribing said reference aperture, said guard band absorbing light and said guard band separating light traveling through said reference aperture from light reflected by said reference fiducial.

17. A displacement-measuring device for determining relative motion of an object, comprising:

a first coherent light source of a first frequency ($f_0$) and first wavelength (S);

a second coherent light source of a second frequency ($f_0+\Delta f$), said second frequency near said first frequency;

a first beam splitter, said first beam splitter splitting said first frequency light;

a first reflective fiducial reflecting said split first frequency light back to said first beam splitter to provide first fiducial light, said first fiducial defining an aperture through which light may pass;

a second reflective fiducial coupled to the object and reflecting said split first frequency light back to said first beam splitter to provide second fiducial light;

said first beam splitter reflecting light reflected by said first and second reflective fiducials;

a second beam splitter receiving said light reflected by said first beam splitter and receiving said second frequency light;

a first photodetector receiving light from said second beam splitter, said light received by said first photodetector being generally only light reflected by said first reflective fiducial and said second frequency light;

a second photodetector receiving light from said second beam splitter, said light received by said second photodetector being generally only light reflected by said second reflective fiducial and said second frequency light; and a phase meter coupled to said first and second photodetectors, said phase meter determining phase differences in light received by said first and second photodetectors; whereby relative motion between said first and second reflective fiducials is determined by said phase differences and said first wavelength.

18. A displacement-measuring device for determining relative motion of an object as set forth in claim 17, wherein said first beam splitter further comprises:

a polarizing beam system including a polarizing beam splitter, a quarter-wave plate, and a half-wave plate;

said polarizing beam splitter receiving said first frequency light and transmitting resulting P-polarized light to said quarter-wave plate and discarding resulting S-polarized light;

said quarter-wave plate receiving said P-polarid light from said polarizing beam splitter and transmitting circularly polarized light to said first and second reflective fiducials;

said quarter-wave plate receiving light reflected by said first and second reflective fiducials said first fiducial and said second fiducial light being circularly polarized, said quarter-wave plate transmitting S-polarized light to said polarizing beam splitter;

said polarizing beam splitter receiving said quarter-wave plate S-polarized light and reflecting said quarter-wave plate S-polarized light to said half-wave plate; and said half-wave plate receiving said reflected S-polarized light from said polarizing beam splitter and transmitting P-polarized light to said light-combining system; whereby circularly polarized light of said first frequency ($f_0$) is reflected by said reference fiducial and said displacement fiducial and P-polarized light of said first frequency ($f_0$) is transmitted to said light-combining system.

19. A displacement-measuring device for determining relative motion of an object as set forth in claim 17, further comprising:

said first and second light source including laser light selected from the group consisting of:
laser light from a Zeeman laser; and
first and second modulated laser beams derived from a single split laser beam, including acousto-optically modulated laser beams.

20. A displacement-measuring device for determining relative motion of an object as set forth in claim 17, wherein said reference fiducial further comprises:

a guard band, said guard band circumscribing said aperture defined by said first fiducial, said guard band absorbing light and separating light traveling through said circular aperture from light reflected by said first fiducial.

* * * * *